R. G. CAMERON.
LOCK.
APPLICATION FILED FEB. 27, 1919.
1,317,547.
Patented Sept. 30, 1919.
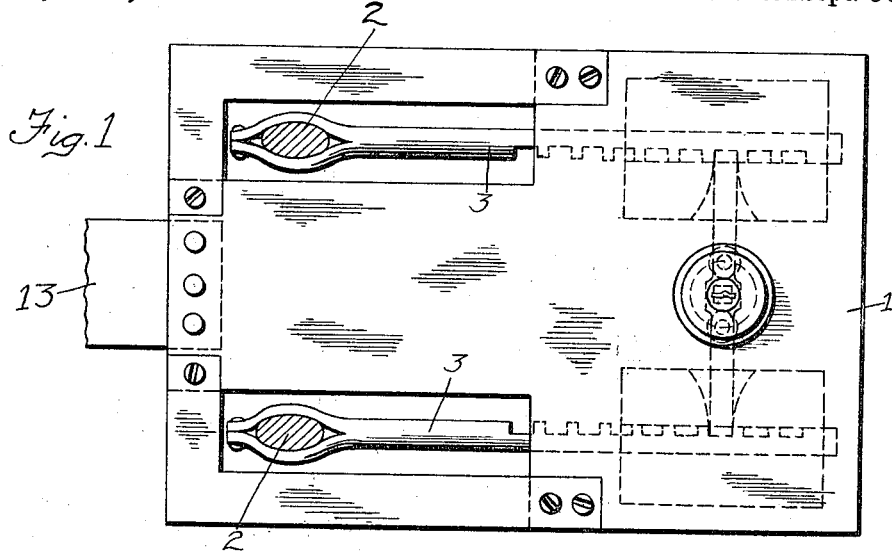
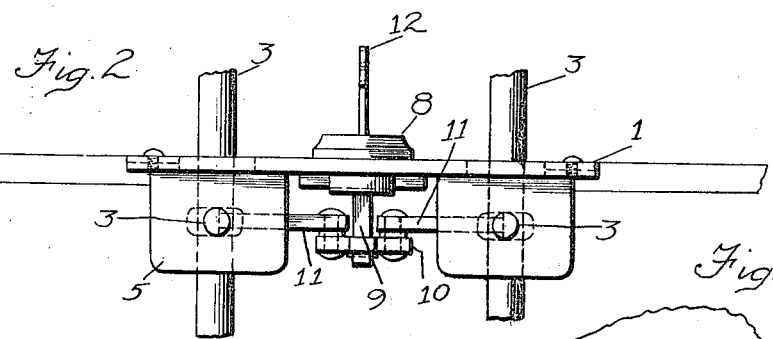
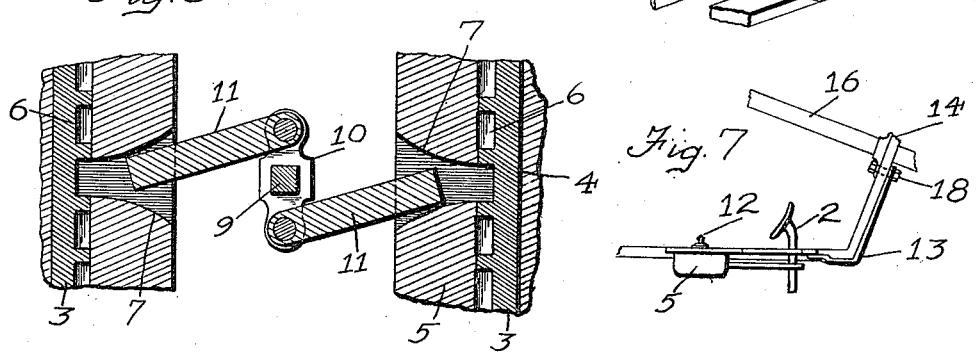
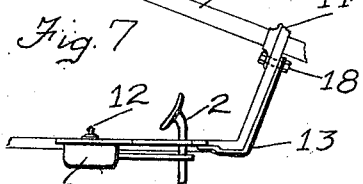
WITNESSES
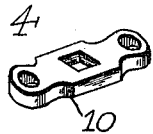
INVENTOR
R. G. Cameron
BY
ATTORNEYS

UNITED STATES PATENT OFFICE.

ROBERT G. CAMERON, OF SAN ANTONIO, TEXAS.

LOCK.

1,317,547.  Specification of Letters Patent.  Patented Sept. 30, 1919.

Application filed February 27, 1919. Serial No. 279,573.

*To all whom it may concern:*

Be it known that I, ROBERT G. CAMERON, a citizen of the United States, and a resident of San Antonia, in the county of Bexar and State of Texas, have invented certain new and useful Improvements in Locks, of which the following is a specification.

My invention is an improvement in locks, and has for its object to provide a device of the character specified for locking the control pedals of a motor vehicle from movement in either direction, the said lock being arranged between the pedals and arranged to simultaneously engage and lock both.

In the drawings:

Figure 1 is a top plan view of the rods with the operating levers in section;

Fig. 2 is an end view;

Fig. 3 is a section on the line 3—3 of Fig. 2;

Fig. 4 is a perspective view of the bolt operating cross head;

Fig. 5 is a similar view of one of the bolts;

Fig. 6 is a perspective view showing a fragment of the plate through which the pedals project.

Fig. 7 is a fragmentary side elevation of the front portion of the floor boards and dash of a motor vehicle showing my lock in position.

In the present embodiment of the invention the plate 1 which carries the control pedals of a motor car is fastened to the floor boards, and the pedals 2 extend through the plate. Rods 3 are mounted to slide in passages 4 in blocks 5 which are secured to the under face of the plate, and each of the said rods 3 is provided on its inner face with a series of notches or recesses 6.

The rods 3 are connected with the pedals 2 in any convenient manner and each of the blocks 5 has a flaring recess 7 on its inner face, with the inner ends of which the notches 6 on the rods are adapted to register, as shown in Fig. 3.

A lock casing 8 of suitable construction, as, for instance, a pin lock, is arranged between the rods 3, and the bolt 9 of the lock carries a cross head 10 at its lower end. Bolts 11 are pivoted to the ends of the cross head, and these bolts at their free ends normally engage within tapering recesses 7 and are adapted to enter those notches of the rods which are in register with the openings 7, to positively lock the rods and consequently the pedals from movement in either direction.

When the bolt 9 is turned by the key 12 the bolts 11 are normally thrown into the recesses 6 or withdrawn therefrom to release the rods and pedals. When the key is withdrawn from the lock with the parts in locked position, it is obvious that the control pedals may not be moved by unauthorized parties.

As shown in Fig. 7, an angle plate 13 is connected with the forward end of the plate 1, and this angle plate fits against the forward face of the foot board 14, and is secured to the foot board by one of the bolts 15 which connects the steering mechanism indicated at 16 to the dash.

I claim:

In combination with the control pedals of a motor vehicle, locking means comprising a plate having at one end slots through which the pedals operate, spaced blocks depending from the underside of said plate at the other end thereof and provided upon their opposing faces with horizontally disposed recesses having flaring entrance openings, said blocks being further provided with horizontal passages communicating with the inner ends of said recesses, rods connected with the pedals and slidable through said passages, the opposing faces of said rods being provided with a plurality of notches, a lock carried by said plate between said blocks and having a vertically extending operating shank depending below the plate, a cross head carried by said shank, and bolts pivoted upon the ends of said cross head and movable into said recesses and into engagement with selected ones of said notches registering with the inner ends of the recesses whereby to hold said pedals against movement.

ROB'T G. CAMERON.

Witnesses:
A. H. CAMERON,
E. MOLSA.

Copies of this patent may be obtained for five cents each, by addressing the "Commissioner of Patents, Washington, D. C."